July 14, 1970 O. D. NOVIKOV ET AL 3,520,128
AUTOMATIC TIME DISTRIBUTION SYSTEM
Filed Nov. 28, 1967
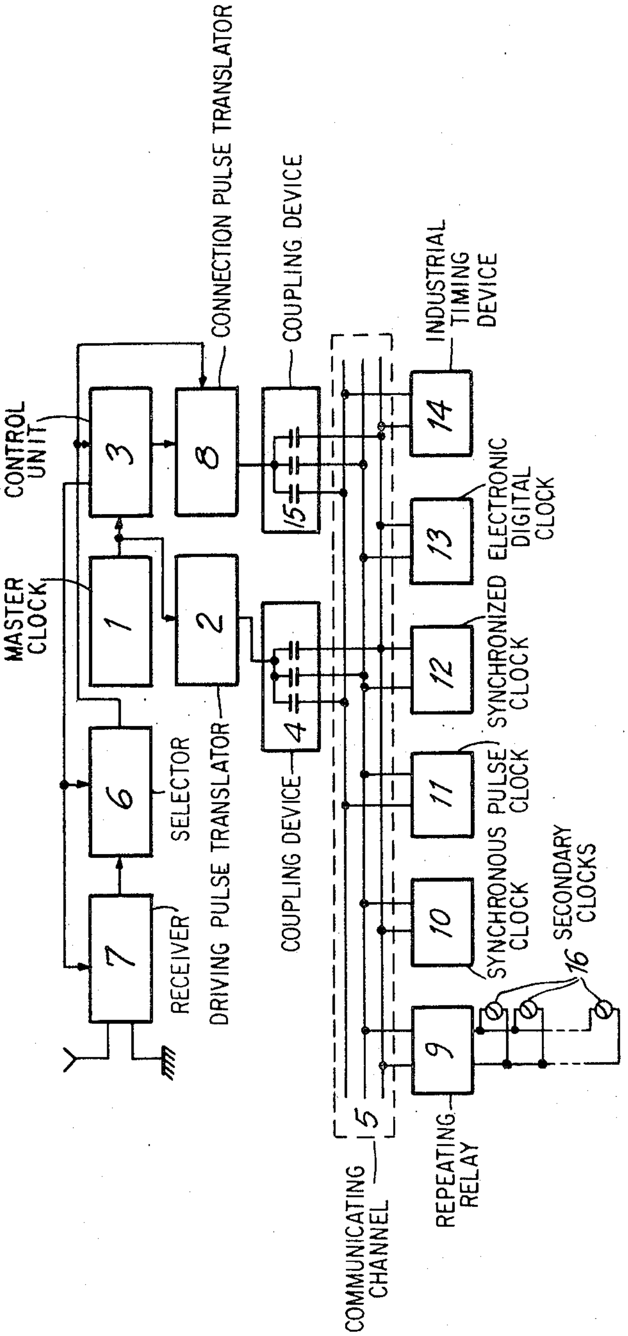

United States Patent Office

3,520,128

Patented July 14, 1970

3,520,128

AUTOMATIC TIME DISTRIBUTION SYSTEM

Oleg Dmitrievich Novikov, Trifonovskaya ul. 6I, kv. 69; Viktor Alexandrovich Ilin, Oruzheiny per. 25, kv. 126; Vladimir Alexandrovich Shpolyansky, Ul. Lizy Chaikinoi 6, kv. 113; Valery Germanovich Serebrenny, Golianovo, korp. 32, kv. 77; Eduard Khadzhimusovich Chichev, I Dmitrovsky proezd 4, kv. 117; and Boris Leonidovich Rudyakov, Novokuznetskaya ul. 24, kv. 15, all of Moscow, U.S.S.R.

Filed Nov. 28, 1967, Ser. No. 686,268

Claims priority, application U.S.S.R., Nov. 28, 1966, 1,117,271

Int. Cl. G04c *13/02*

U.S. Cl. 58—33 2 Claims

ABSTRACT OF THE DISCLOSURE

An automatic time distribution system in which an independent master clock is connected to a plurality of secondary timing devices via a receiver of exact time radio signals and a selector of exact time signals connected to the receiver for detection of a time mark, which is used as a base for generating a signal to correct the secondary timing devices and for conversion of the time mark to a correction signal. A control unit has inputs connected to the selector and the independent master clock and it includes means for generating its own correction signal when a correction signal fails to come from the selector in due time. A communication channel is connected to the secondary timing devices while an informational driving pulse translator has an input connected to the independent master clock and an output connected to the communication channel, and an informational correction pulse translator has inputs respectively connected to the control unit and to the selector of exact time signals and an output connected to the communication channel.

The invention relates to time measuring devices and, more specifically, to automatic time distribution systems.

Conventional time distribution systems comprise a synchronous master clock of continuous timing which is used as a time information source, and a communication channel in the form of a special three-wire line, one conductor of which is used for the correction pulse transmission from the selector to the secondary timing devices, whereas two other conductors convey a low-voltage industrial-frequency alternating current.

A disadvantage of such a system is that it excludes the use of most commonly utilized secondary timing devices of discrete type and, moreover, it requires construction of the three-wire communication line involving considerable increase in the total cost of the system.

It is an object of the present invention to provide an automatic time distribution system which will enable the use of secondary timing devices of both continuous and discrete type.

An automatic time distribution system which employs for the communication channel existing lines such as telephone lines, telegraph lines, and distribution mains. With these and other objects in view, the invention resides in the fact that in an automatic distribution system in which secondary timing devices are connected through a communication channel with a source of time information and a selector connected to a receiver of exact time radio signals to detect a time mark to be used for the correction of said secondary timing devices, in accordance with the invention, an independent master clock is employed as a source of time information and the communication channel comprises an informational driving pulse translator connected to the output of the independent master clock and an information correction pulse translator connected by its inputs respectively to the selector and to a first output of a control unit which is connected to the outputs of the selector and of the independent master clock and which is provided with a device for generating its own correction signal transmitted to the informational correction pulse translator when a correction signal fails to be received from the selector in due time.

It is advantageous that the control unit have a second output connected to the receiver of exact time signals and with the selector in order to switch them on just before the period when the exact time signals are transmitted over the radio and to switch them off by the correction signal.

The invention is hereinafter described in detail with reference to an embodiment thereof and the accompanying drawing showing a block-diagram of an automatic time distribution system.

The source of time information in the system herein described is an independent master clock 1 with a second- or minute-interval output, preferably a crystal clock having a high accuracy. Other discrete-action clocks may be used as well, provided the requirements for accuracy for the system are met.

The output of the independent master clock is connected to a driving pulse translator 2 and to a control unit 3. The translator 2 serves to convert the seconds- or minutes-marking electric pulses produced by the master clock 1 to high-frequency signals which are then sent to a communication channel 5 through a coupling device 4.

The control unit 3 has two inputs and two outputs. One of the inputs of this unit is connected to a selector 6 for reception of a signal used for system correction. One of the outputs of the control unit 3 is connected to the selector 6 and to a receiver 7 of exact time signals, which, in turn, is connected with the selector 6, to switch them on just before the period of transmission of exact time signals over the radio and to switch them off by the correction signal. Although the preferred embodiment of the control unit 3 has two outputs, it is also possible to eliminate its second output through which the control unit 3 is connected to the receiver 7 and selector 6, thereby leaving the latter two units operative all the time.

The first output of the control unit 3 is connected to a first input of a correction pulse translator 8, whereas the second input of said translator 8 is connected to the selector 6. The arrangement of the control unit 3 is such that in any case, on the basis of time information arriving from the independent master clock 1, it generates at preset time intervals, its own correction signal which is sent to the translator 8 if within this pre-set time period the latter fails to receive an informational correction signal from the selector 6.

In this way, with the selector 6 functioning normally, the informational correction signal comes to the translator 8 directly from the selector 6, otherwise this signal arrives from the control unit 3. And, if the control of switching the receiver 7 and selector 6 on and off is performed by the control unit 3, the latter lets the receiver 7 and the selector 6 be in the "on" position until a regular correction signal arrives from the selector 6.

The translator 2 converts the second- or minute-repetition rate electric pulses coming from the master clock 1 into high-frequency signals of the same periodicity which are sent through the coupling device 4 into the communication channel 5 to which secondary timing devices 9, 10, 11, 12, 13, 14 are connected. The translator 8 converts the correction signals arriving thereat from the selector 6 or the control unit 3 into high-frequency correction signals, which are sent through the coupling device 15 to the communication channel 5 for correction of the secondary timing devices 9–14. The periodicity of correction may be chosen at will. Preferably, it is effected once an hour. To ensure normal performance of the translators 2 and 8, their operating frequencies are chosen to be different.

Since the high-frequency pulses coming from the translators 2 and 8 are essentially informational low-power pulses, the undesirable effect upon various radio and measuring equipment connected to the same communication channel, usually observed when transmitting powerful non-informational pulses through the communication channel is eliminated.

In the communication channel 5 there may be used a suitable line system such as: distribution mains, telephone, telegraph, rediffusion network, etc., for connecting secondary timing devices thereto. The embodiment herein described uses distribution mains in the communication channel, since one and the same line ensures transmission to the secondary timers 9 to 14 of both the informational signals from the translators 2 and 8 and the power supply. If telephone, telegraph, rediffusion or other lines of the type are used instead of distribution mains, self-contained power packs must be provided for supplying power to the secondary timing devices.

As is shown in the drawing, in the particular embodiment of the present invention, the secondary timing devices 9, 10, 11, 12, 13, 14 are connected to the communication channel. The device 9 is a translation relay which enables existing secondary clocks 16 to be incorporated into the automatic time distribution system.

The device 9 is designed, depending on the type of the secondary timing devices 16 employed, to receive the informational driving pulses and/or correction pulses. It converts the pulses received into control signals for the secondary timing devices.

The secondary synchronous timing devices 10 are actuated by the distribution means frequency and corrected, while receiving correction signals from the translator 8, at preset time intervals, preferably, hourly.

Pulse clocks 11 with pointer-type indication, synchronized clocks 12, electronic digital clocks 13 and industrial timing devices 14 (the latter include time recorders, program clocks, time clocks, etc.) receive correction pulses from the translator 8. The periodicity of the correcting pulse reception for various secondary timing devices can be different.

The automatic time distribution system operates as follows:

The independent master clock 1, e.g. a crystal clock, sends electric pulses every second or every minute to the translator 2 and control unit 3. The translator 2 converts these pulses into high-frequency signals of the same periodicity which are transmitted via the coupling device 4 and the communication channel 5 to the secondary timing devices 9, 11, 12, 13, 14. The secondary timing devices 10 are of the synchronous type and do not respond to these pulses since they are actuated by the mains frequency.

The control unit 3 repeats the movement of the master clock 1. Every hour, approximately 3 to 5 minutes before the transmission of exact-time radio signals, this unit switches on the receiver 7 and the selector 6. The exact-time signals received by the receiver 7 are transmitted to the selector 6 which detects one of them to be used to correct the system as a whole. The detected signal transformed into a square pulse is sent to the control unit 3 and the translator 8.

Upon arrival of the pulse at the control unit 3, the receiver 7 and selector 6 are switched off. The correction pulse received by the translator 8 is converted into a high-frequency correction signal which is sent via the coupling device 15 into the comunication channel 5 through which it arrives at the secondary timing devices 9, 10, 11, 12, 13, 14.

In the control unit 3 the received correction signal performs a correction of time readings and switches off the receiver 7 and the selector 6.

Since the operating frequencies of the translators 2 and 8 aer different, the driving pulses and the correction pulses can be transmitted through the communication channel simultaneously. Thus, every secondary timing device, whether of the discrete or continuous type is corrected once an hour by the exact time signals. Obviously the periodicity of correction may be other than that described depending on the requirements imposed on the system.

If for some reason, the correction signal fails to come from the selector 6 to the control unit 3 at a preset time, the control unit 3 generates its own correction signal which is sent to the translator 8 and further on as with the normal correction procedure. In this situation the receiver 7 and the selector 6 remain in the on position until a first (sequential) correction signal arrives at the control unit 3.

It is also possible for the receiver 7 and the selector 6 to be constantly kept in the switched-on position. In this case, however, the consumption of energy is increased and there is greater probability of spurious correction due to radio interference.

Although this invention is described in connection with a preferred embodiment, various modifications and variations thereof will become apparent to those skilled in the art without departing from the scope and spirit of the invention.

What is claimed is:

1. An automatic time distribution system, comprising a plurality of secondary electric time indicating devices, an independent master clock, means responsive to said independent master clock and operative to produce electrical timing signals at time instants determined by the time established by said independent master clock, communication means connected to supply said electrical timing signals to at least one of said secondary electric time indicating devices to control the time indication thereof, radio receiving means operative to produce primary electrical correction signals occurring at time instants established by a radio signal, control means operative in synchronism with said independent master clock to produce a secondary electrical correction signal in the event that any particular primary correction signal fails to occur at a perdetermined time as established by said independent master clock, and second communication means for receiving said primary electrical correction signals and said secondary electrical correction signals and in response thereto supply correction signals to said secondary electric time indicating devices, whereby each primary correction signal synchronizes said secondary electrical time indicating devices with said primary time standard and each secondary correction signal synchronizes said secondary electric time indicating devices with said independent master clock.

2. A system according to claim 1, in which said control means includes means operative to switch on said radio receiving means at particular time instants each of which precedes, by a predetermined length of time established with reference to said independent master clock, a respective time instant when, as measured by said independent master clock, a respective primary correction signal is expected, and means operative to switch off said radio receiving means in response to production of each primary correction signal.

References Cited

UNITED STATES PATENTS

| | | | |
|---|---|---|---|
| 1,928,793 | 10/1933 | Poole | 58—24 X |
| 1,928,794 | 10/1933 | Poole | 58—24 X |
| 2,005,158 | 6/1935 | Nicolson | 58—24 X |
| 2,188,145 | 1/1940 | Frantz | 58—24 |
| 2,614,383 | 10/1952 | Pfeffer | 58—24 |
| 2,824,218 | 2/1958 | Gilliland | 58—24 |
| 3,128,465 | 4/1964 | Brilliant | 58—35 X |

RICHARD B. WILKINSON, Primary Examiner

E. C. SIMMONS, Assistant Examiner

U.S. Cl. X.R.

58—24, 35